United States Patent
Maillet et al.

(10) Patent No.: US 11,267,753 B2
(45) Date of Patent: Mar. 8, 2022

(54) GLAZING COMPRISING A PROTECTIVE COATING

(71) Applicant: SAINT-GOBAIN GLASS FRANCE, Courbevoie (FR)

(72) Inventors: Alexandre Maillet, Compiegne (FR); Laura Jane Singh, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 168 days.

(21) Appl. No.: 15/538,992

(22) PCT Filed: Dec. 22, 2015

(86) PCT No.: PCT/FR2015/053734
§ 371 (c)(1),
(2) Date: Jun. 22, 2017

(87) PCT Pub. No.: WO2016/102897
PCT Pub. Date: Jun. 30, 2016

(65) Prior Publication Data
US 2017/0362121 A1 Dec. 21, 2017

(30) Foreign Application Priority Data

Dec. 23, 2014 (FR) ..................... 1463253

(51) Int. Cl.
*C03C 17/36* (2006.01)
*C03C 17/22* (2006.01)

(52) U.S. Cl.
CPC .......... *C03C 17/3652* (2013.01); *C03C 17/22* (2013.01); *C03C 17/366* (2013.01); *C03C 17/3613* (2013.01); *C03C 17/3626* (2013.01); *C03C 17/3634* (2013.01); *C03C 17/3644* (2013.01); *C03C 17/3649* (2013.01); *C03C 17/3681* (2013.01); *C03C 2217/212* (2013.01); *C03C 2217/228* (2013.01); *C03C 2217/256* (2013.01); *C03C 2217/27* (2013.01); *C03C 2217/28* (2013.01); *C03C 2217/281* (2013.01); *C03C 2217/73* (2013.01); *C03C 2217/78* (2013.01); *C03C 2218/156* (2013.01)

(58) Field of Classification Search
None
See application file for complete search history.

(56) References Cited

U.S. PATENT DOCUMENTS

| | | | | |
|---|---|---|---|---|
| 5,563,734 A * | 10/1996 | Wolfe | ..................... | C03C 17/36 204/192.27 |
| 5,948,538 A * | 9/1999 | Brochot | .................. | C03C 17/36 359/359 |
| 6,045,896 A * | 4/2000 | Boire | ....................... | C03C 17/36 204/192.23 |
| 6,060,178 A * | 5/2000 | Krisko | ..................... | C03C 17/36 359/359 |
| 6,287,675 B1 * | 9/2001 | Guiselin | ........... | B32B 17/10174 428/213 |
| 6,413,643 B1 * | 7/2002 | Kunisada | ................. | C03C 17/36 359/360 |
| 6,416,872 B1 * | 7/2002 | Maschwitz | ....... | B32B 17/10174 428/469 |
| 7,659,002 B2 * | 2/2010 | Coster | ............... | B32B 17/10036 428/432 |
| 8,105,695 B2 * | 1/2012 | Depauw | ................... | C03C 17/36 428/432 |
| 2002/0176988 A1 * | 11/2002 | Medwick | ............. | B65G 49/069 428/408 |
| 2003/0143401 A1 | 7/2003 | Hukari et al. | | |
| 2003/0228471 A1 * | 12/2003 | Hayakawa | ............... | C03C 3/066 428/426 |
| 2005/0106397 A1 * | 5/2005 | Krisko | .............. | B32B 17/10036 428/432 |
| 2005/0153126 A1 * | 7/2005 | Finley | .................. | B65G 49/069 428/336 |
| 2005/0260419 A1 * | 11/2005 | Hukari | ................ | C03C 17/3435 428/428 |
| 2006/0246300 A1 * | 11/2006 | Hevesi | .................... | C03C 17/36 428/432 |
| 2010/0266823 A1 * | 10/2010 | Hukari | ................ | C03C 17/3626 428/212 |
| 2011/0008641 A1 | 1/2011 | Di Stefano | | |
| 2011/0020638 A1 * | 1/2011 | Di Stefano | ............. | C03C 17/36 428/336 |
| 2012/0087005 A1 * | 4/2012 | Reymond | ............... | C03C 17/36 359/360 |
| 2013/0115468 A1 * | 5/2013 | Kharchenko | ............ | B05D 5/12 428/426 |

OTHER PUBLICATIONS

International Search Report dated Mar. 18, 2016 in PCT/FR2015/053734, filed Dec. 22, 2015.

* cited by examiner

*Primary Examiner* — Callie E Shosho
*Assistant Examiner* — John Vincent Lawler
(74) *Attorney, Agent, or Firm* — Oblon, McClelland, Maier & Neustadt, L.L.P.

(57) ABSTRACT

A material includes a transparent substrate coated with a stack of thin layers acting on infrared radiation including at least one functional layer. The stack includes a protective coating deposited above at least a part of the functional layer. The protective coating includes at least one lower protective layer based on titanium and zirconium, these two metals being in the metal, oxidized or nitrided form, and at least one upper protective layer of carbon, within which layer the carbon atoms are essentially in an $sp^2$ hybridization state, located above the layer based on titanium and zirconium.

15 Claims, No Drawings

GLAZING COMPRISING A PROTECTIVE COATING

The invention relates to a material and to a process for obtaining a material, such as a glazing, comprising a transparent substrate coated with a stack of thin layers acting on infrared radiation comprising at least one functional layer.

Materials comprising stacks acting on infrared radiation are used in "solar control" glazings targeted at reducing the amount of solar energy entering and/or in "low-e" glazings targeted at reducing the amount of energy dissipated toward the outside of a building or of a vehicle.

The functional layers are deposited between coatings based on dielectric materials which generally comprise several dielectric layers making it possible to adjust the optical properties of the stack.

The mechanical strength of these complex stacks is often insufficient, this being the case, a fortiori, when the functional layers are silver-based metal layers (or silver layers). This low strength is reflected by the appearance in the short term of defects, such as sites of corrosion, scratches, indeed even the complete or partial tearing of the stack during its use under standard conditions. All defects or scratches, whether due to corrosion or mechanical stresses, are liable to detrimentally affect not only the attractiveness of the coated substrate but also its optical and energy performance levels.

Upper protective layers are conventionally used for various purposes, in particular for improving the scratch resistance, the wet corrosion resistance and the resistance to high-temperature heat treatments.

In the case of "solar control" or "low-e" glazings, the aim is generally not to significantly increase the absorption in the visible region. This constraint has to be taken into account in the choice of materials constituting the stack and in particular the upper protective layers.

For example, upper protective layers based on titanium oxide or on mixed zinc tin oxide are known. These upper protective layers are not very absorbing. However, the substrates coated with such layers do not exhibit a satisfactory scratch resistance.

It is also known to use layers of carbon in the graphite or amorphous form for improving the scratch resistance.

"DLC" (Diamond-Like Carbon) amorphous carbon layers comprise carbon atoms in a mixture of $sp^2$ and $sp^3$ hybridization states. Such layers cannot be deposited by a conventional magnetron process. They are generally obtained by plasma-enhanced chemical vapor deposition (PECVD), by laser ablation, by arc sputtering or by ion beam deposition.

"Graphite" carbon layers comprise carbon atoms essentially in an $sp^2$ hybridization state. Such layers considerably increase the absorption in the visible region and the infrared region of the material comprising them. Consequently, these layers are used either as temporary protective layer, or at low thicknesses.

When the graphite carbon layers are used as temporary protective layer, they can be removed during a heat treatment, by oxidation to give carbon dioxide. The residual absorption after heat treatment is minimal.

When the graphite carbon layers are used at thicknesses of the order of a nanometer, the improvement in the scratch resistance may be insufficient.

There exists a need to more effectively protect substrates coated with stacks acting on infrared radiation comprising functional layers during the stages of manufacture, of transformation, of transportation and/or of storage. There also exists a need to improve the scratch resistance of substrates coated with a stack acting on infrared radiation without modifying the optical properties, such as the absorption in the visible region.

The applicant has discovered, surprisingly, that the use of a protective coating comprising at least two layers, a lower protective layer based on titanium and zirconium and an upper protective layer based on graphite carbon, makes it possible to considerably improve the scratch resistance.

The protective coating according to the invention is effective even when the carbon-based upper protective layer is extremely thin, in particular of less than 1 nm. According to this embodiment, the scratch resistance is improved without modifying the optical properties, such as the absorption in the visible region.

The invention relates to material comprising a transparent substrate coated with a stack of thin layers acting on infrared radiation comprising at least one functional layer, characterized in that the stack comprises a protective coating deposited above at least a part of the functional layer, the protective coating comprising:

at least one lower protective layer based on titanium and zirconium, these two metals being in the metal, oxidized or nitrided form, at least one upper protective layer of carbon, within which layer the carbon atoms are essentially in an $sp^2$ hybridization state, located above the layer based on titanium and zirconium.

The lower protective layer based on titanium and zirconium comprises these two metals being in the metal, oxidized or nitrided form (hereinafter based on titanium and zirconium). This lower protective layer exhibits, in increasing order of preference, a ratio by weight of titanium to zirconium Ti/Zr of between 60/40 and 90/10, between 60/40 and 80/20, between 60/40 and 70/30, between 60/40 and 65/35.

The lower protective layer based on titanium and zirconium exhibits, in increasing order of preference, an atomic ratio of titanium to zirconium Ti/Zr of between 70/30 and 95/5, between 70/30 and 85/15, between 70/30 and 80/20.

The layers of zirconium and titanium oxide can be deposited from a $TiZrO_x$ ceramic target. The ratio of titanium to zirconium Ti/Zr in the layer is virtually equivalent to that of the target.

The ceramic targets can optionally comprise other elements which are encountered in the layers deposited from these targets.

The lower protective layer has a thickness:
of less than or equal to 10 nm, of less than or equal to 7 nm or of less than or equal to 5 nm, and/or
of greater than or equal to 1 nm, of greater than or equal to 2 nm or of greater than or equal to 3 nm.

The upper protective layer of carbon used comprises carbon atoms forming carbon-carbon bonds essentially in an $sp^2$ hybridization state. It is considered that the carbon atoms of the layer are essentially in an $sp^2$ hybridization state when at least 80%, at least 90%, indeed even 100%, of the carbon atoms are in an $sp^2$ hybridization state. The hybridization of the carbon atoms can be characterized by Fourier transform infrared (FTIR) spectroscopy.

The carbon layer according to the invention differs in this characteristic from the "DLC" layers, which are layers of optionally hydrogenated amorphous carbon comprising carbon atoms in a mixture of $sp^2$ and $sp^3$ hybridization states, preferably essentially the $sp^3$ hybridization state. The carbon atoms are not essentially in an $sp^2$ hybridization state.

The upper protective layer of carbon according to the invention can be obtained by magnetic-field-assisted cathode sputtering, for example using a graphite target. The atmosphere in the deposition chamber comprises a neutral gas, preferably argon.

According to one embodiment, the upper protective layer has a thickness:
of less than or equal to 5 nm, of less than or equal to 2 nm, of less than 1 nm, and/or
of greater than or equal to 0.1 nm, of greater than or equal to 0.2 nm, of greater than or equal to 0.5 nm.

According to an advantageous embodiment, the upper protective layer has a thickness strictly of less than 1 nm, preferably between 0.2 and 0.8 nm. These thin carbon layers do not significantly modify the absorption in the visible region. These layers do not necessarily have to be removed, even when high light transmissions are desired.

The protective coating composed of two protective layers according to the invention contributes a significant improvement to the scratch resistance, in comparison with permanent conventional protective layers, that is to say layers not intended to be removed, based on titanium dioxide ($TiO_2$) or on mixed zinc tin oxide ($SnZnO_x$).

According to this embodiment, the variation in the light absorption in the visible region ΔAbs. brought about by the upper protective layer is less than 10%, preferably less than 5% and better still less than 2%. The variation is obtained by measuring the light absorption of a substrate coated with a stack not comprising an upper protective layer (Abs. Ref.) and of one and the same coated substrate comprising the upper protective layer (Abs. Inv.) and by then carrying out the following calculation: ΔAbs.=(Abs. Ref.—Abs. Inv.).

All the light characteristics presented in the present description are obtained according to the principles and methods described in the European standard EN 410 relating to the determination of the light and solar characteristics of the glazings used in glass for the construction industry. Abs. is understood to mean, within the meaning of the present description, the absorption at normal incidence, under the D65 illuminant, with a field of vision of 2°.

The use of a protective coating comprising in particular an upper protective layer exhibiting a low thickness results in excellent scratch resistance properties, while keeping the absorption in the visible region low.

The stack is deposited by magnetic-field-assisted cathode sputtering (magnetron process). According to this advantageous embodiment, all the layers of the stack are deposited by magnetic-field-assisted cathode sputtering.

Unless otherwise mentioned, the thicknesses alluded to in the present document are physical thicknesses and the layers are thin layers. Thin layer is understood to mean a layer exhibiting a thickness of between 0.1 nm and 100 micrometers.

Throughout the description, the substrate according to the invention is regarded as positioned horizontally. The stack of thin layers is deposited above the substrate. The meaning of the expressions "above" and "below" and "lower" and "upper" is to be considered with respect to this orientation. Unless specifically stipulated, the expressions "above" and "below" do not necessarily mean that two layers and/or coatings are positioned in contact with one another. When it is specified that a layer is deposited "in contact" with another layer or with a coating, this means that there cannot be one or more layers inserted between these two layers.

The functional layer is chosen from:
a functional metal layer based on silver or on a silver-containing metal alloy,
a functional metal layer based on niobium,
a functional layer based on niobium nitride.

The functional layers are preferably silver-based functional metal layers.

A silver-based functional metal layer comprises at least 95.0%, preferably at least 96.5% and better still at least 98.0% by weight of silver, with respect to the weight of the functional layer. Preferably, the silver-based functional metal layer comprises less than 1.0% by weight of metals other than silver, with respect to the weight of the silver-based functional metal layer.

The thickness of the silver-based functional layers is, in increasing order of preference, of from 5 to 20 nm, from 8 to 15 nm.

The silver layers are deposited between coatings based on dielectric materials which generally comprise several dielectric layers making it possible to adjust optical properties of the stack. In addition, these dielectric layers make it possible to protect the silver layer from chemical or mechanical attacks. The stack of thin layers thus advantageously comprises at least one silver-based functional metal layer, and at least two coatings based on dielectric materials, each coating comprising at least one dielectric layer, so that each functional metal layer is positioned between two coatings based on dielectric materials.

The coatings based on dielectric materials exhibit a thickness of greater than 15 nm, preferably of between 15 and 50 nm and better still from 30 to 40 nm.

The dielectric layers of the coatings based on dielectric materials exhibit the following characteristics, alone or in combination:
they are deposited by magnetic-field-assisted cathode sputtering,
they are chosen from dielectric layers having a barrier function or having a stabilizing function,
they are chosen from oxide or nitrides of one or more elements chosen from titanium, silicon, aluminum, tin and zinc,
they have a thickness of greater than 5 nm, preferably between 8 and 35 nm.

Dielectric layers having a barrier function is understood to mean a layer made of a material capable of forming a barrier to the diffusion of oxygen and water at high temperature, originating from the ambient atmosphere or from the transparent substrate, toward the functional layer. The dielectric layers having a barrier function can be based on silicon and/or aluminum compounds chosen from oxides, such as $SiO_2$, nitrides, such as silicon nitrides $Si_3N_4$ and aluminum nitrides AlN, or oxynitrides $SiO_xN_y$, optionally doped using at least one other element. The dielectric layers having a barrier function can also be based on zinc tin oxide.

Dielectric layers having a stabilizing function is understood to mean a layer made of a material capable of stabilizing the interface between the functional layer and this layer. Dielectric layers having a stabilizing function are preferably based on crystalline oxide, in particular based on zinc oxide, optionally doped using at least one other element, such as aluminum. The dielectric layer or layers having a stabilizing function are preferably zinc oxide layers.

The dielectric layer or layers having a stabilizing function can occur above and/or below at least one silver-based functional metal layer or each silver-based functional metal layer, either directly in contact with it or separated by a blocking layer.

According to an advantageous embodiment, the stack comprises a dielectric layer based on silicon and/or aluminum nitride located above at least a part of the functional layer and below the lower protective layer based on titanium and zirconium. The dielectric layer based on silicon and/or aluminum nitride has a thickness:
of less than or equal to 100 nm, of less than or equal to 50 nm or of less than or equal to 40 nm, and/or
of greater than or equal to 15 nm, of greater than or equal to 20 nm or of greater than or equal to 25 nm.

The dielectric layer based on silicon and/or aluminum nitride is preferably in contact with the lower protective layer based on titanium and zirconium.

The lower protective layer based on titanium and zirconium is preferably in contact with the upper protective layer.

The upper protective layer is preferably the final layer of the stack, that is to say the layer furthest from the substrate coated with the stack.

The stacks can additionally comprise blocking layers, the function of which is to protect the functional layers by preventing possible damage related to the deposition of a coating based on dielectric materials or related to a heat treatment. According to one embodiment, the stack comprises at least one blocking layer located below and in contact with a silver-based functional metal layer and/or at least one blocking layer located above and in contact with a silver-based functional metal layer.

Mention may be made, among the blocking layers conventionally used, in particular when the functional layer is a silver-based metal layer, of blocking layers based on a metal chosen from niobium Nb, tantalum Ta, titanium Ti, chromium Cr or nickel Ni or based on an alloy obtained from at least two of these metals, in particular on an alloy of nickel and chromium (NiCr).

The thickness of each blocking overlayer or underlayer is preferably:
at least 0.5 nm or at least 0.8 nm and/or
at most 5.0 nm or at most 2.0 nm.

An example of a suitable stack according to the invention comprises:
a coating based on dielectric materials located below the silver-based functional metal layer, it being possible for the coating to comprise at least one dielectric layer based on silicon and/or aluminum nitride,
optionally a blocking layer,
a silver-based functional metal layer,
optionally a blocking layer,
a coating based on dielectric materials located above the silver-based functional metal layer, it being possible for the coating to comprise at least one dielectric layer based on silicon and/or aluminum nitride,
a protective coating.

The transparent substrates according to the invention are preferably made of a rigid inorganic material, such as made of glass, in particular soda-lime-silica glass, or of an organic material based on polymers (or made of polymer).

The organic transparent substrates according to the invention can also be made of polymer, and are rigid or flexible. Examples of polymers which are suitable according to the invention comprise, in particular:
polyesters, such as polyethylene terephthalate (PET), polybutylene terephthalate (PBT) or polyethylene naphthalate (PEN);
polyacrylates, such as polymethyl methacrylate (PMMA);
polycarbonates;
polyurethanes;
polyamides;
polyimides;
fluorinated polymers, such as fluoroesters, for example ethylene-tetrafluoroethylene (ETFE), polyvinylidene fluoride (PVDF), polychlorotrifluoroethylene (PCTFE), ethylene-chlorotrifluoroethylene (ECTFE) or fluorinated ethylene-propylene copolymers (FEP);
photocrosslinkable and/or photopolymerizable resins, such as thiolene, polyurethane, urethane-acrylate, polyester-acrylate resins, and
polythiourethanes.

The thickness of the substrate generally varies between 0.5 mm and 19 mm. The thickness of the substrate is preferably less than or equal to 6 mm, indeed even 4 mm.

The material, that is to say the transparent substrate coated with the stack, is not heat treated, but it may be intended to undergo a high-temperature heat treatment chosen from an annealing, for example a flash annealing, such as a laser or flame annealing, a tempering and/or a bending. The temperature of the heat treatment is greater than 400° C., preferably greater than 450° C., and better still greater than 500° C. The implementation or not of a heat treatment on the material according to the invention will depend on the application for which said material is intended. The properties of the material according to the invention, demonstrated here, namely the scratch resistance, are independent of any one heat treatment. The substrate coated with the stack, forming the material according to the invention, can thus be bent or unbent and/or tempered or untempered. It is then said that it can be tempered and/or bent.

The substrate coated with the stack can be is a bent and/or tempered glass.

The material can be in the form of a monolithic glazing, of a laminated glazing or of a multiple glazing, in particular a double glazing or a triple glazing.

The invention also relates to a process for the preparation of a material comprising a transparent substrate coated with a stack of thin layers deposited by cathode sputtering, optionally assisted by a magnetic field; the process comprises the sequence of the following stages:
at least one functional layer is deposited on the transparent substrate, then
at least one dielectric layer based on silicon and/or aluminum nitride is optionally deposited above the functional layer, then
a lower protective layer based on titanium and zirconium, these two metals being in a metal, oxidized or nitrided form, is deposited above the dielectric layer based on silicon and/or aluminum nitride,
an upper protective layer of carbon, obtained by sputtering of a carbon target, preferably a graphite target, is deposited.

The process can additionally comprise the stage during which the substrate coated with the stack of thin layers is subjected to heat treatment at a temperature of greater than 400° C., preferably 500° C.

Finally, the invention relates to the use of a material as described above for manufacturing a glazing. It can, for example, be a building or vehicle glazing.

EXAMPLES

Stacks of thin layers defined below are deposited on substrates made of clear soda-lime glass with a thickness of 4 mm.

For these examples, the conditions of the deposition of the layers deposited by sputtering ("magnetron cathode" sputtering) are summarized in table 1 below.

The layers of zirconium and titanium oxide are deposited from a $TiZrO_x$ ceramic target. The titanium to zirconium Ti/Zr ratio in the target is 64:36 by weight, corresponding to 77:23 biatoms. The ratio of titanium to zirconium Ti/Zr in the layer is virtually equivalent to that of the target.

TABLE 1

| | Targets employed | Deposition pressure | Gases | Index* |
|---|---|---|---|---|
| $Si_3N_4$ | Si:Al (92:8% by weight) | $2-15*10^{-3}$ mbar | Ar: 30-60%-$N_2$: 40-70% | 2.00 |
| NiCr | Ni:Cr (80:20% at.) | $1-5*10^{-3}$ mbar | Ar at 100% | — |
| Ag | Ag | $2-3*10^{-3}$ mbar | Ar at 100% | — |
| $TiO_2$ | $TiO_x$ | $1.5*10^{-3}$ mbar | Ar 88%-$O_2$ 12% | 2.32 |
| TiZrO | $TiZrO_x$ | $2-4*10^{-3}$ mbar | Ar 90%-$O_2$ 10% | 2.32 |
| C | Graphite | $1.5*10^{-3}$ mbar | Ar at 100% | 2.25 | at. biatoms;
*at 550 nm

The substrates coated with stacks which are protected according to the invention can be tempered and bent.

| Glazing | | Comparative | Invention |
|---|---|---|---|
| Upper protective layer | C | 0.8 | 0.8 |
| Lower protective layers | $TiZrO_x$ | — | 3 |
| | $TiO_x$ | 3 | — |
| Antireflective coating | $Si_3N_4$ | 35 | 35 |
| Blocking layer BO | NiCr | 0.4 | 0.4 |
| Functional layer | Ag | 7 | 7 |
| Blocking layer BU | NiCr | 0.7 | 0.7 |
| Antireflective coating | $Si_3N_4$ | 35 | 35 |
| Substrate (mm) | Glass | 4 | 4 |

Different tests were carried out on the material according to the invention in order to evaluate the mechanical strength of the stack:
Erichsen scratch test (EST),
Erichsen brush test (EBT), before and after tempering, at 1000 cycles,
Opel test at 2000 cycles,
Cleaning test.

The Erichsen brush test (EBT) consists in subjecting different coated substrates, before tempering (EBT) and after tempering (TT-EBT) to a certain number of cycles (1000) during which the stack, covered with water, is rubbed using a brush. It is considered that a substrate satisfies the test if no mark is visible to the naked eye. The test before tempering gives a good indication with regard to the ability of the glazing to be scratched during a washing operation. The test after tempering gives a good indication with regard to the propagation of the scratches after heat treatment.

The Erichsen scratch test (EST) consists in applying a force on the sample, in Newtons, using a tip (Van Laar tip, steel ball). Depending on the scratch resistance of the stack, different types of scratches can be obtained: continuous, noncontinuous, wide, narrow, and the like.

The Opel test makes it possible to evaluate the abrasion resistance. It is carried out in accordance with the standard EN1096-2 at 2000 cycles.

The cleaning test consists of three passes of the substrate through the washing machine.

The material according to the invention satisfies each of these tests and gives, from the viewpoint of the scratch resistance, excellent results.

The invention claimed is:

1. A material comprising a transparent substrate coated with a stack of thin layers acting on infrared radiation comprising at least one functional layer, wherein the stack comprises a protective coating deposited above at least a part of the at least one functional layer, the protective coating comprising:
   at least one lower protective layer based on titanium and zirconium, these two metals being in the metal, oxidized or nitrided form, wherein the at least one lower protective layer based on titanium and zirconium has a thickness of greater than or equal to 2 nm and less than or equal to 5 nm and wherein the at least one lower protective layer based on titanium and zirconium exhibits a ratio by weight of titanium to zirconium Ti/Zr of between 60/40 and 90/10,
   at least one upper protective layer of carbon, within which layer the carbon atoms are essentially in an $sp^2$ hybridization state, located above the at least one lower protective layer based on titanium and zirconium, wherein the at least one upper protective layer has a thickness of between 0.2 and 0.8 nm, and wherein the at least one lower protective layer based on titanium and zirconium is in contact with the at least one upper protective layer, and
   at least one dielectric layer based on silicon nitride and/or aluminum nitride located above at least a part of the at least one functional layer and below the at least one lower protective layer based on titanium and zirconium, wherein the at least one dielectric layer based on silicon nitride and/or aluminum nitride has a thickness of less than or equal to 50 nm and of greater than or equal to 15 nm and wherein the at least one dielectric layer based on silicon nitride and/or aluminum nitride is in contact with the at least one lower protective layer based on titanium and zirconium.

2. The material as claimed in claim 1, wherein the material is configured to undergo a heat treatment.

3. The material as claimed in claim 1, wherein the material is untempered.

4. The material as claimed in claim 1, wherein the material is tempered.

5. The material as claimed in claim 1, wherein the material is tempered and/or bent.

6. The material as claimed in claim 1, wherein the at least one dielectric layer based on silicon nitride and/or aluminum nitride has a thickness:
   of less than or equal to 50 nm, and
   of greater than or equal to 20 nm.

7. The material as claimed in claim 1, wherein the at least one functional layer is chosen from:
   a functional metal layer based on silver or on a silver-containing metal alloy,
   a functional metal layer based on niobium, and
   a functional layer based on niobium nitride.

8. The material as claimed in claim 7, wherein the functional layer is chosen from a functional metal layer based on silver or on a silver-containing metal alloy and wherein the stack further comprises at least one blocking layer located below and in contact with the functional metal layer based on silver or on a silver-containing metal alloy and/or at least one blocking layer located above and in contact with the functional metal layer based on silver or on a silver-containing metal alloy; the blocking layer or layers are based on a metal chosen from niobium Nb, tantalum Ta, titanium Ti, chromium Cr or nickel Ni or based on an alloy obtained from at least two of these metals.

9. The material as claimed in claim 7, wherein the functional layer is chosen from a functional metal layer based on silver or on a silver-containing metal alloy, and wherein the stack further comprises:

a coating based on dielectric materials located below the functional metal layer based on silver or on a silver-containing metal alloy, the coating comprising at least one dielectric layer based on silicon and/or aluminum nitride, a coating based on dielectric materials located above the functional metal layer based on silver or on a silver-containing metal alloy, the coating comprising at least one dielectric layer based on silicon and/or aluminum nitride, and the protective coating.

10. The material as claimed in claim 1, wherein the stack of thin layers comprises at least one silver-based functional metal layer, and at least two coatings based on dielectric materials, each coating comprising at least one dielectric layer, so that each functional metal layer is positioned between two coatings based on dielectric materials.

11. The material as claimed in claim 1, wherein the transparent substrate is:
  made of glass, or
  made of polymer.

12. The material as claimed in claim 1, wherein the at least one lower protective layer based on titanium and zirconium is in oxidized form.

13. The material as claimed in claim 1, wherein the at least one lower protective layer based on titanium and zirconium is in oxidized or nitrided form.

14. A process for the preparation of the material of claim 1, wherein the material comprises the transparent substrate coated with the stack of thin layers deposited by cathode sputtering, the process comprising the sequence of the following stages:
  depositing the at least one functional layer on the transparent substrate, then
  depositing the at least one dielectric layer based on silicon and/or aluminum nitride above the at least one functional layer, then
  depositing the lower protective layer based on titanium and zirconium, these two metals being in a metal, oxidized or nitrided form, above the at least one dielectric layer based on silicon and/or aluminum nitride,
  depositing the upper protective layer of carbon, obtained by sputtering of a carbon target on the lower protective layer based on titanium and zirconium.

15. A method of
manufacturing a glazing comprising incorporating the material as claimed in claim 1 into the glazing.

* * * * *